UNITED STATES PATENT OFFICE.

GUSTAVE O. ZELLER, OF RAHWAY, NEW JERSEY.

PROCESS OF MANUFACTURING PYROXYLIN SOLVENTS AND THEIR PRODUCTS.

SPECIFICATION forming part of Letters Patent No. 518,387, dated April 17, 1894.

Application filed December 12, 1893. Serial No. 493,616. (No specimens.)

*To all whom it may concern:*

Be it known that I, GUSTAVE O. ZELLER, a citizen of the United States, residing in the city of Rahway, county of Union, and State of New Jersey, have invented certain new and useful Improvements in Processes of Manufacturing Pyroxylin Solvents and their Products; and I do hereby declare that the following is a full, clear, and exact description of the invention, which will enable others skilled in the art to which it appertains to use the same.

My invention has for its object the preparation of thick and thin solutions of pyroxyline with solvents that are improvements upon and modifications of what I have termed aldesters, prepared (as described in an application for Letters Patent filed December 12, 1893, and serially numbered 493,615) by the action of an oxidizing agent on an alcohol, producing an aldehyde, and with an organic acid also produced by the action of the oxidizing agent, or otherwise caused to be present or added. These compounds are like in their nature to esters of the alcohols as combined with an organic acid, and differ in that they have origin in aldehydic radicles united to acid radicles. In further pursuance of my researches in this subject, I find that similarly to an organic acid producing mixed esters with mixed alcohols, the hydrogen of the carboxyles may be substituted by two or more aldehydic radicles, and thereby may be formed compounds that are solvents of pyroxyline. That is, by treating two or more alcohols, either primary, secondary, or tertiary, with an oxidizing agent capable of producing therefrom aldehydic radicles, in the presence of an organic acid also thus or otherwise produced, or added, such compounds are produced. Of course more than one organic acid may be added or will be formed, producing complex compounds. I find that these compounds are excellent solvents and diluents of solutions and of solutions of pyroxyline, and exceed in solvent power a mixture of the compounds formed from single primary alcohols, not themselves solvent of pyroxyline, oxidized in the presence of a compounding organic acid.

As an example of a formula and of a specific process (to which I do not limit myself as to ingredients nor proportions) I take amylic alcohol four parts by weight; butylic alcohol, two parts; acetic acid, one part; formic acid, one part; and I subject this mixture to the action of sulphuric acid two parts, with peroxide of manganese one part; separating the new solvent as formed from the oxidized mixture by a usual process of distillation; cleansing and washing the product if requisite.

Having described my invention, what I claim, and desire to secure by Letters Patent, is—

1. The process of manufacturing solvents of pyroxyline which consists in treating a mixture of two or more alcohols, in the presence of a compounding organic acid, or acids, with an oxidizing agent, substantially as described.

2. The process of manufacturing solvents of pyroxyline, which consists in treating a mixture of two or more alcohols with an oxidizing agent, producing thereby mixed aldehydes and organic acids having mutual reactions, and separating these mixed oxidation compounds thus produced by distillation; and cleansing and washing the distillate.

3. A pyroxyline compound which is the product of solution of pyroxyline in mixed oxidation compounds of two or more primary alcohols oxidized in the presence of a compounding organic acid.

GUSTAVE O. ZELLER.

Witnesses:
R. DOLMETSCH,
C. L. BORGMEYER.